(12) United States Patent
Zakrzewski et al.

(10) Patent No.: US 11,212,347 B2
(45) Date of Patent: Dec. 28, 2021

(54) PRIVATE CONTENT STORAGE WITH PUBLIC BLOCKCHAIN METADATA

(71) Applicant: S&P Global Inc., New York, NY (US)

(72) Inventors: Thomas Zakrzewski, Mahwah, NJ (US); Marcus Isaac Daley, New York, NY (US)

(73) Assignee: S&P Global Inc., New York, NY (US)

( * ) Notice: Subject to any disclaimer, the term of this patent is extended or adjusted under 35 U.S.C. 154(b) by 359 days.

(21) Appl. No.: 16/268,419

(22) Filed: Feb. 5, 2019

(65) Prior Publication Data

US 2020/0252457 A1    Aug. 6, 2020

(51) Int. Cl.
| | |
|---|---|
| *H04L 29/08* | (2006.01) |
| *H04L 9/32* | (2006.01) |
| *H04L 29/06* | (2006.01) |
| *H04L 9/08* | (2006.01) |
| *H04L 9/06* | (2006.01) |

(52) U.S. Cl.
CPC ........ *H04L 67/1097* (2013.01); *H04L 9/0637* (2013.01); *H04L 9/0825* (2013.01); *H04L 9/3213* (2013.01); *H04L 9/3242* (2013.01); *H04L 63/107* (2013.01); *H04L 63/1425* (2013.01)

(58) Field of Classification Search
CPC . H04L 67/1097; H04L 9/3242; H04L 9/3213; H04L 63/1425; H04L 9/0825; H04L 63/107; H04L 9/0637
USPC ......................................................... 713/165
See application file for complete search history.

(56) References Cited

U.S. PATENT DOCUMENTS

| | | | |
|---|---|---|---|
| 2006/0282864 A1* | 12/2006 | Gupte | H04N 21/25816 725/89 |
| 2017/0250972 A1* | 8/2017 | Ronda | H04L 63/123 |
| 2018/0239897 A1* | 8/2018 | Ventura | G06F 21/53 |
| 2019/0065764 A1* | 2/2019 | Wood | G06F 21/6209 |
| 2019/0332783 A1* | 10/2019 | Bhardwaj | H04L 9/3239 |
| 2019/0354693 A1* | 11/2019 | Yoon | G06F 21/6245 |
| 2019/0372756 A1* | 12/2019 | Kim | G06F 16/182 |
| 2020/0204876 A1* | 6/2020 | Thompson | H04N 21/2541 |

OTHER PUBLICATIONS

Medium.com [online], "Learn to securely share files on the blockchain with IPFS!" Feb. 20, 2018, retrieved from: URL<https://medium.com/@mycoralhealth/learn-to-securely-share-files-on-the-blockchain-with-ipfs-219ee47df54c>, 11 pages.

Sribalaji et al., "Secure and decentralized file transfer application using blockchain," International Journal of Current Engineering and Scientific Research 4(4):2393-8374, 2017.

\* cited by examiner

*Primary Examiner* — Bryan F Wright

(74) *Attorney, Agent, or Firm* — Fish & Richardson P.C.

(57) ABSTRACT

This specification relates to methods and systems for content management. One of the methods includes: receiving data identifying a user; verifying that the user is an authorized user; receiving initial content from the authorized user; encrypting the initial content using an encryption key to produce encrypted content; forwarding the encrypted content for storage; creating content storage metadata; encrypting the content storage metadata to provide encrypted content storage metadata; and forwarding the encrypted content storage metadata to a blockchain such as a public ledger.

15 Claims, 8 Drawing Sheets

PRIVATE CONTENT STORAGE WITH PUBLIC BLOCKCHAIN METADATA

BACKGROUND

Technical Field

This specification relates to content management systems and methods that incorporate a blockchain component.

Background

Many business activities are performed under regional and/or national regulatory requirements. For example, the General Data Protection Regulation (GDPR) is a regulation in the European Union (EU) that provides data protection and privacy for individuals within the EU. It also relates to the export of personal data outside the EU. Similarly, China has regulation related to the export of certain data. Doing business globally and at the same time ensuring compliance with regulations within various jurisdictions is often costly and difficult.

SUMMARY

This specification describes technologies for managing content. As noted above, doing business globally and at the same time ensuring compliance with regulations within various jurisdictions is often costly and difficult. Blockchain technologies can provide transparency and nonrepudiation for various business activities. However, one problem with current blockchain technology is that a public blockchain does not protect confidentiality for the recorded activity and a private blockchain has a complex infrastructure that limits the number of participants and imposes certain technical limitations on their performance.

Private blockchains provide additional built-in services such as removal of user anonymity and restriction of access to blockchain resources through policies. Various components are necessary to provide these services. Therefore the number of components grows in proportion to the number of participating organizations. In addition, each component of the infrastructure needs to be configured and managed, thus making installation and maintenance a complex task.

Technologies described in this specification can incorporate advantageous aspects of both private and public blockchain approaches in the following ways. Embodiments of content management technologies described in this specification can:

1) Separate transaction records from transaction content enabling the protection of the content via strong encryption, preserving the confidentiality of the content. Embodiments can change encryption approaches over time without affecting the transaction records nonrepudiation mechanism for past-recorded transactions. Nonrepudiation is the assurance that someone cannot deny something. Typically, nonrepudiation refers to the ability to ensure that a party to a contract or a communication cannot deny the authenticity of their signature on a document or the sending of a message that they originated. One might want to change the encryption approach used due to changes in regulatory requirements, due to changes in technological capabilities (such as the development of encryption approaches resilient to quantum computing), and/or due to cybersecurity intrusion detection.
2) Combine necessary elements of a private blockchain into one logical deployable unit and enable deployment for new participants without administrator intervention.
3) Maintain permissioned access to a private encrypted data based on policies and identities and maintain transparency in viewing transactions and transaction content to permissioned identities only.
4) Allow regulatory agencies to verify records.
5) Enable deletion of transaction content while maintaining nonrepudiation for all actions including deletion.
6) Enable a separation between proof that a transaction occurred and the content of the transaction itself. Such separation allows embodiments of the content management system to keep the content in question within the restricted territory boundaries.

Content management technologies described in this specification can incorporate a blockchain approach such as a private blockchain Open Source project (e.g., Hyperledger Fabric). Although certain embodiments incorporate a private blockchain, these embodiments can solve common problems of a private blockchain by doing the following:

Reducing deployment complexity

Increasing performance as only records of the transactions are saved on the "main" ledger and data associated with the transactions (e.g., content data such as files) are kept off the ledger in encrypted format, e.g., in an interplanetary file system (IPFS).

Making integration easier with Identities Management by enabling various parties to participate in the blockchain network with easy integration of their own User Directories Integrating distributed Key Management for the following Keys and secrets by using:
  A user's private Keys
  A document's encryption Key
  Server permissions Is prepared for Quantum Computing era—embodiments of the system can:
  Separate a content encryption mechanism from the content's transaction verification
  Enable Key rotations and re-encryption of documents avoiding customer disruption.
  Enable re-encryption of documents with new post quantum computing encryption approaches without disruption to customers Introduces multilevel security for verifications and access to confidential data (secrets) so that embodiments can
  Reduce risk of compromising access to encryption Keys by using advanced cryptographic methods, i.e. splitting encryptions keys and secrets into multiple parts and distributing them to multi locations—use of multiparty computational algorithm approaches; and
  Allow access to routines assembling Keys only to those identified by their Identities (Private/Public Keys)

In general, one innovative aspect of the subject matter described in this specification can be embodied in methods that include the actions of: receiving data identifying a user; verifying that the user is an authorized user; receiving initial content from the authorized user; creating a numeric representation of the content such as a message digest; encrypting the initial content using an encryption key to produce encrypted content; forwarding the encrypted content for storage; creating content storage metadata; encrypting the content storage metadata to provide encrypted content storage metadata; and forwarding the encrypted content storage metadata, along with the message digest to a blockchain such as a "main" ledger.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Another innovative aspect of the subject matter described in this specification can be embodied in systems that include: a distributed identity and access management engine configured to identify a user and to manage access for the user; a key vault configured to store encryption keys used to encrypt content; and a connector engine connected to the identity and access management engine and to the key vault, the connector engine configured to forward content, encrypted using an encryption key stored in the key vault, to a data storage and to forward transaction data to a blockchain.

Yet another innovative aspect of the subject matter described in this specification can be embodied in methods that include the actions of: receiving a request to access content from a user; confirming that the user is authorized to access the content; decrypting the content using an encryption key; creating content storage metadata based at least in part on the identity of the user and the content; encrypting the content storage metadata to provide encrypted content storage metadata; and forwarding the encrypted content storage metadata to a blockchain.

The foregoing and other embodiments can each optionally include one or more of the following features, alone or in combination. In particular, one embodiment includes all the following features in combination. The method can further include determining a hash based at least in part on the initial content and the encrypted content storage metadata can include a hash based at least in part on the initial content and a hash based at least in part on the encrypted content. The method can further include receiving a unique identifier for the initial content and encrypting the unique identifier and the encrypted content storage metadata can include an initial content hash, and an encrypted unique identifier of the initial content. The method can further include controlling access for the authorized user. Controlling access for the authorized user can include controlling access of the authorized user based at least in part on the at least one of the location and the citizenship of the authorized user. Controlling access for the authorized user can include determining if the authorized user is authorized to perform at least one of accessing and posting a specified item of content. Controlling access for the authorized user can include using the principle of least privilege.

Verifying that the user is an authorized user can be performed using lightweight directory access protocol. The encryption key can be unique to the initial content and the method can further include storing the encryption key in a key vault system. The method can further include: receiving a plurality of content items; encrypting each content item with a unique encryption key resulting in a plurality of encryption keys; and storing the plurality of encryption keys across nodes in the key vault system.

The storage can be a private, content-addressable, peer-to-peer system of storing and sharing content in a distributed file system such as the interplanetary file system. Forwarding the encrypted content for storage can include splitting content across nodes in a distributed file system. Encrypting the initial content can include encrypting the initial content at rest and in motion.

The method can further include automatically examining system data for anomalous activity and in the event of anomalous activity above a threshold re-encrypting encrypted content. Implementations can detect anomalous activities by comparing activity to established and/or known patterns. For example: during a certain period of time, access logs can be compared with patterns associated with a particular use case and/or a particular user. Real-time analytics can run an AB test if usage patterns differs in a statistically significant way. Factors that can be considered include: time, frequency, use case, users involved, and type of documents. Once an anomaly is detected, the rotation of keys can be triggered and/or the system can alert relevant parties, e.g., the information security department, about the incident.

The method can further include providing an authorized regulator access to the content storage metadata. The blockchain can be a public ledger blockchain. The content storage metadata can include transaction data identifying particular content and who transacted with the particular content.

The identity and access management engine can be configured to allow a user access to a document if attributes for the user indicate that the user has access to the document. The content can be a plurality of documents and each document in the plurality of documents can have a unique key.

The subject matter described in this specification can be implemented in particular embodiments so as to realize one or more of the following advantages. Embodiments of a content management system can:

1) enable control of data localization and compliance with local regulatory requirements such as privacy regulations especially GDPR;
2) enable a change in encryption approaches without affecting users of the system (users can continue read and write data to the system). Such systems contemplate developments in quantum computing resilient encryption approaches and enable changing ciphers encryption from factorial based to post quantum encryption.
3) Add an additional level of protection to communications by using multiparty computation algorithm approaches splitting encryption Keys into multiple parts;
4) Automatically add additional nodes to the network where each node includes all necessary components to be operational on the network. Adding an additional node is possible due to a discovery service, which informs a newly added node about its peer locations. The newly added node can become part of the network upon successful authentication by the network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
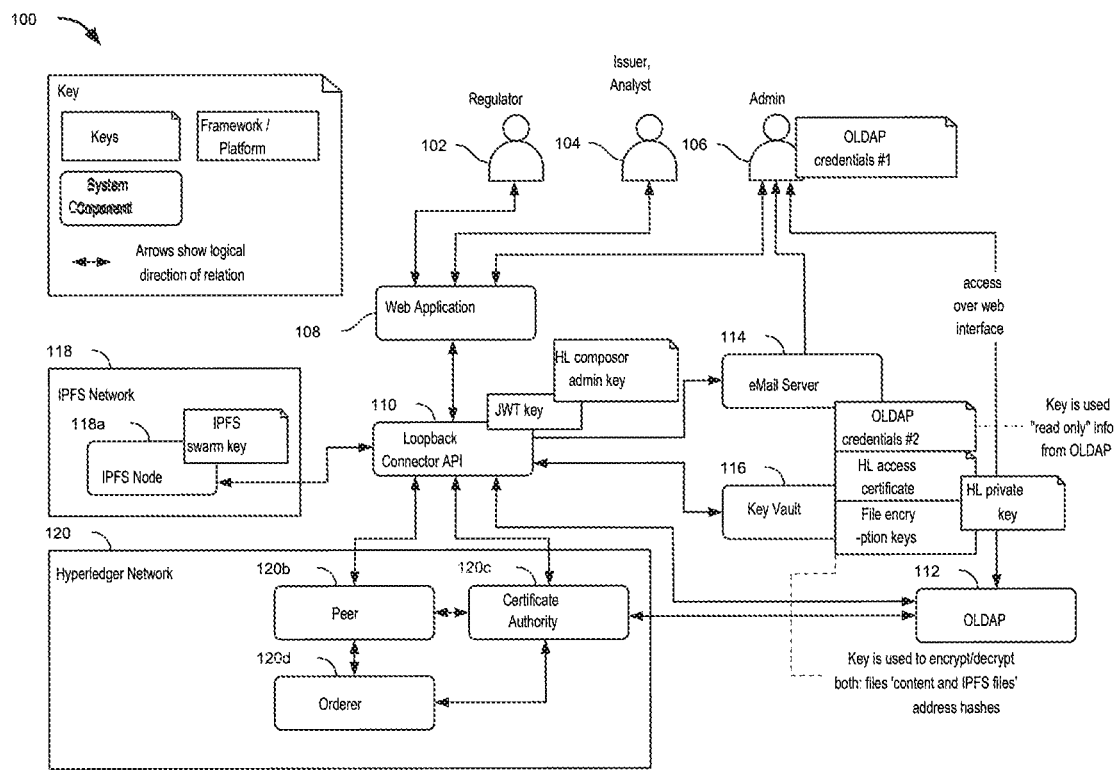
FIG. 1A is component diagram of one example of a content management system.

This specification relates to content management systems and methods. FIG. 1A shows an example content management system 100. The illustrated system includes a web application 108 that can interact with a regulator 102, an issuer or analyst 104 and/or an administrator 106. The web application in turn communicates with a loopback connector API 110. The loopback connector API in turn communicates with: an identity access management (IAM) component 112 such as an OLDAP; an email server 114; a key vault 116; a private content network 118, such as an interplanetary file system (IPFS) network including one or IPFS nodes 118a; and a ledger network 120 such as a public open source ledger blockchain (e.g., Hyperledger Fabric). The ledger network can include one or more peer 120b, orderer 120c and certificate authority 120d components. The peer and certificate authority components can each communicate with the loopback connector API 110 and with the orderer component. The certificate authority 120c can communicate with the IAM component 112.

Issuer/analyst workflow: An analyst or issuer (104) can use the interface of the web application (108) to authenticate herself via an IAM component, e.g., via an OLDAP (112). Once authenticated, an analyst/issuer 104 again using the interface of the web application (108) can read or upload a document from/to IPFS Node (118a) and such a read or upload is validated by Certificate Authority (120C). The Certificate Authority (CA) keeps track of identities and certificates. CA uses OLDAP (Open LDAP) to store the information about the user and components). Essentially any logins to the system by a user or blockchain Fabric components are initiated via CA. Once the CA validates a user, the user can then interact with the workflows. This functionality is native to blockchain Fabric. In certain implementations, only login goes through CA and the upload functionality uses a control access list, as the upload functionality is application specific.

During upload or download the IAM component, e.g., the OLDAP 112 checks the permissions for the role held by the issuer/analyst in question and access to the Key Vault component (116) is granted to retrieve the relevant encryption key to encrypt on upload or decrypt on download of the document.

Regulator workflow: A regulator (102) can use the Interface of the web application (108) to authenticate himself via an IAM component, e.g., via an OLDAP (112); alternatively a regulating agency can maintain its own Peer (120b) and LDAP (112) so that a regulator from such an agency can authenticate within the regulating agency's own system. Once authenticated and granted permission by an administrator (106), a regulator can access a decrypted file stored in the IPFS nodes (118a) using an encryption Key retrieved from Key vault (116). A regulator (102) once authenticated can access peer component (120b) and view transactions logs for stored documents, issuers and analysts; A regulator (102) can compare the hash value recorded on the blockchain ledger with the hash value computed on a document downloaded from the file storage, e.g., IPFS Node (118a), to ensure compliance. For example, a regulator can calculate a message digest of a download document with the message digest saved on the main ledger of the blockchain. In this way the regulator can confirm the document's authenticity. Regulators also can validate the location of the document once the encryption key for IPFS File location is decrypted.

An administrator (106) once authenticated can access Peer (120b) and view all transactions recorded on the blockchain ledger. In addition, an administrator (106) once authenticated can access Peer (120b) and execute Smart Contract permissions to view and access documents. The documents can be filtered based on the individuals, e.g., Regulator (106), Issuer or Analyst (104) who have interacted with the documents.

The IPFS node 118a includes an IPFS swarm key. The loopback connector 110 can hold a JSON Web Token (JWT) key. JWT is an open standard (RFC 7519) that defines a compact and self-contained way for securely transmitting information between parties as a JSON object. The loopback connector 110 can also include a Hyperledger Fabric composer admin key. The key vault 116 can hold a Hyperledger Fabric access certificate, file encryption keys and a Hyperledger Fabric private key.

Figure 1B:
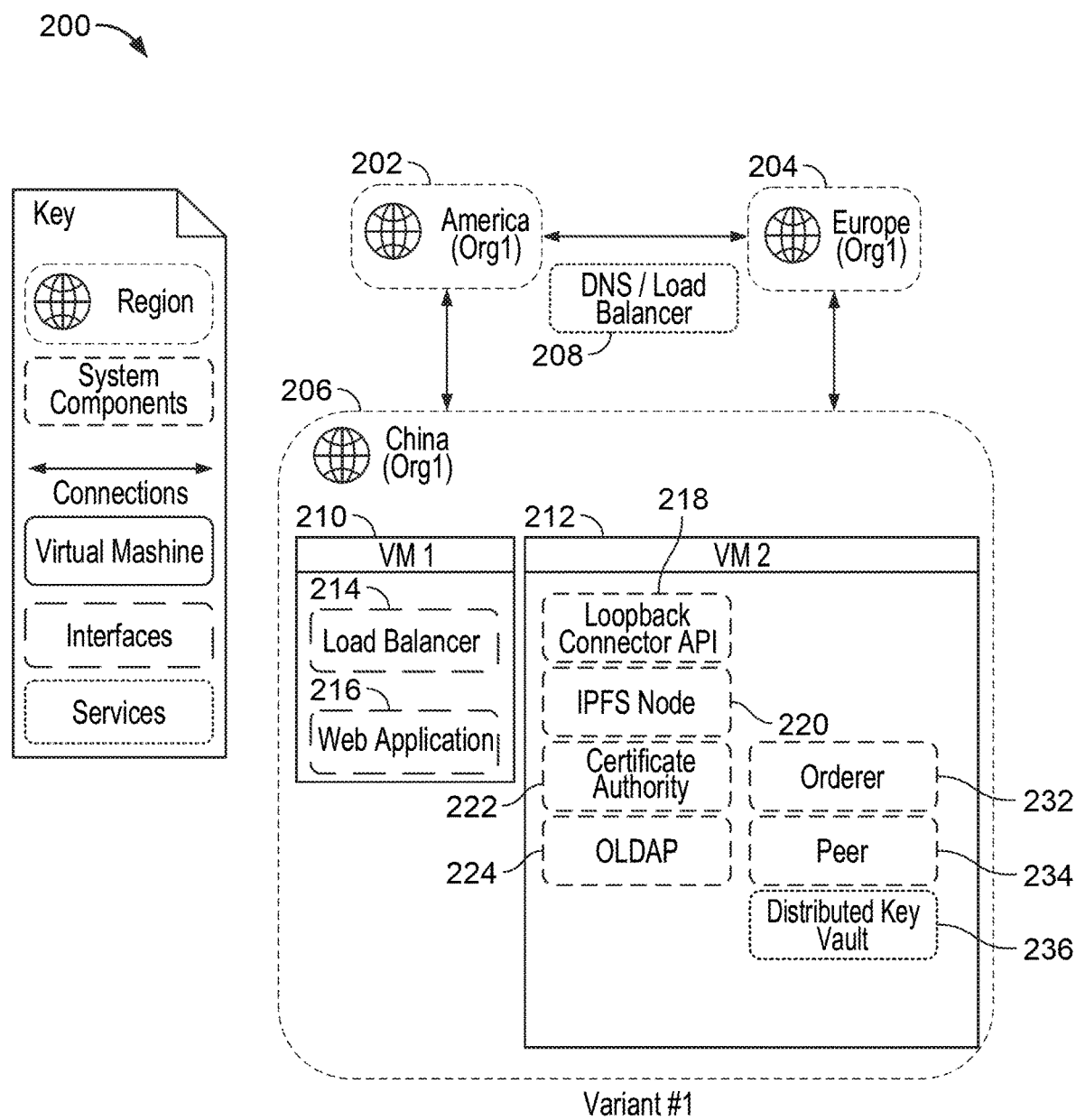
FIG. 1B is a logical deployment diagram for one example of a content management system.

FIG. 1B represents a logical deployment diagram showing a unit constructed from 2 separate Virtual Machines: VM1 (210) which has a web Interface access to VM2 (212), and VM2 (212) which has a set of individual clustered components. All users have access through web interface (214), to web application (216) which holds user interface components corresponding to actions executed within VM2 (212). The diagram shows the VM2 containing components that are related to a blockchain, components that are related to key management, components that are related to data privacy (e.g., data storage) and a loopback connector API 218. Identity management can be managed by an IAM component such as OLDAP 224. Other components, i.e., certificate authority 222, orderer 232 and peer 234 belong to the ledger blockchain. Finally, the diagram show a distributed key vault 236 component for key management. The key management component can be implemented using a multiparty computation approach.

Figure 2:
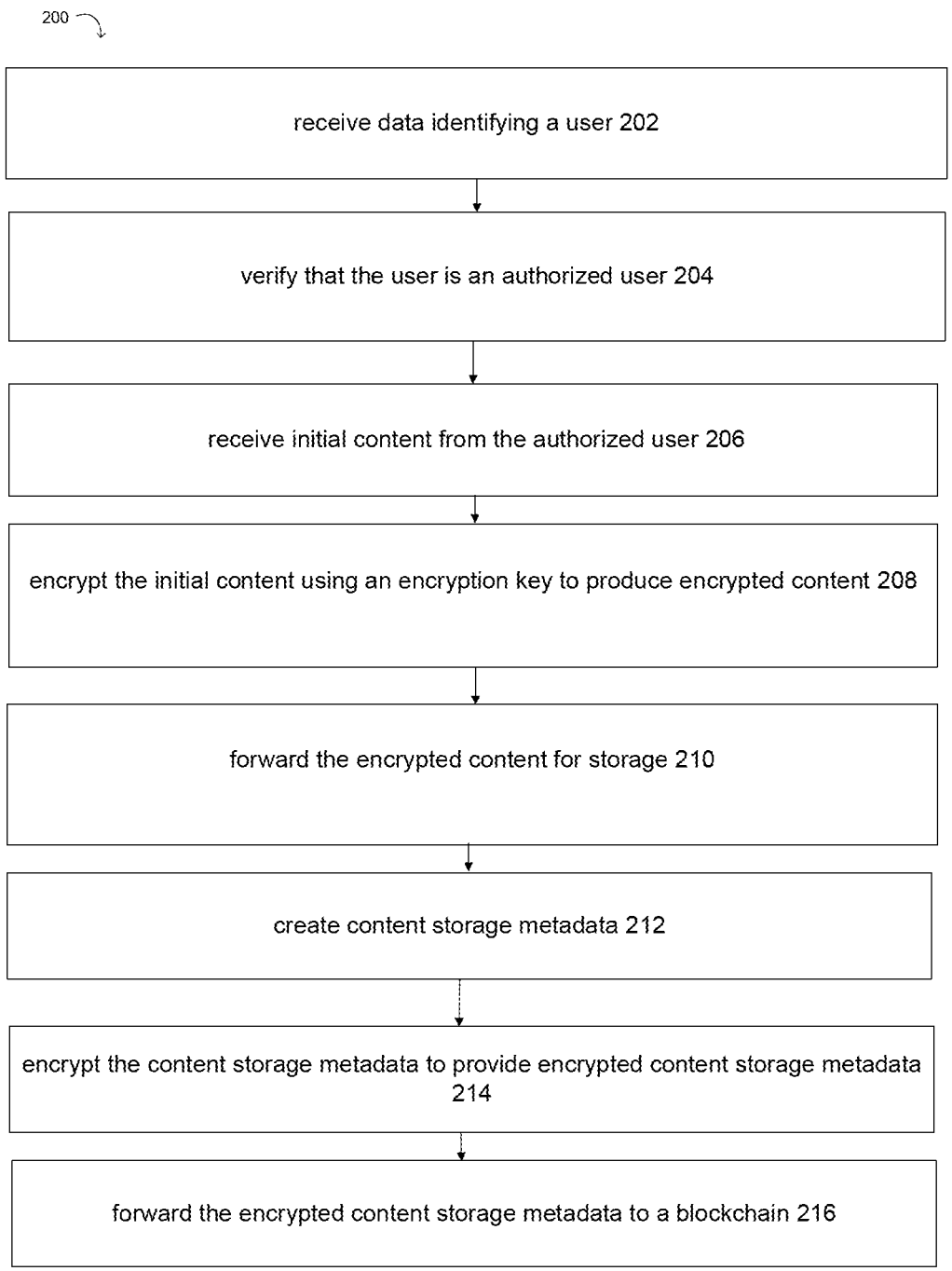
FIG. 2 is a flowchart showing one example of a content management method.

FIG. 2 is a flowchart of an example process 200 for content management. For convenience, the process 200 will be described as being performed by a system of one or more computers, located in one or more locations, and programmed appropriately in accordance with this specification. For example, a content management system, e.g., the content management system 100 of FIG. 1, appropriately programmed, can perform the process 200.

Figure 3A:
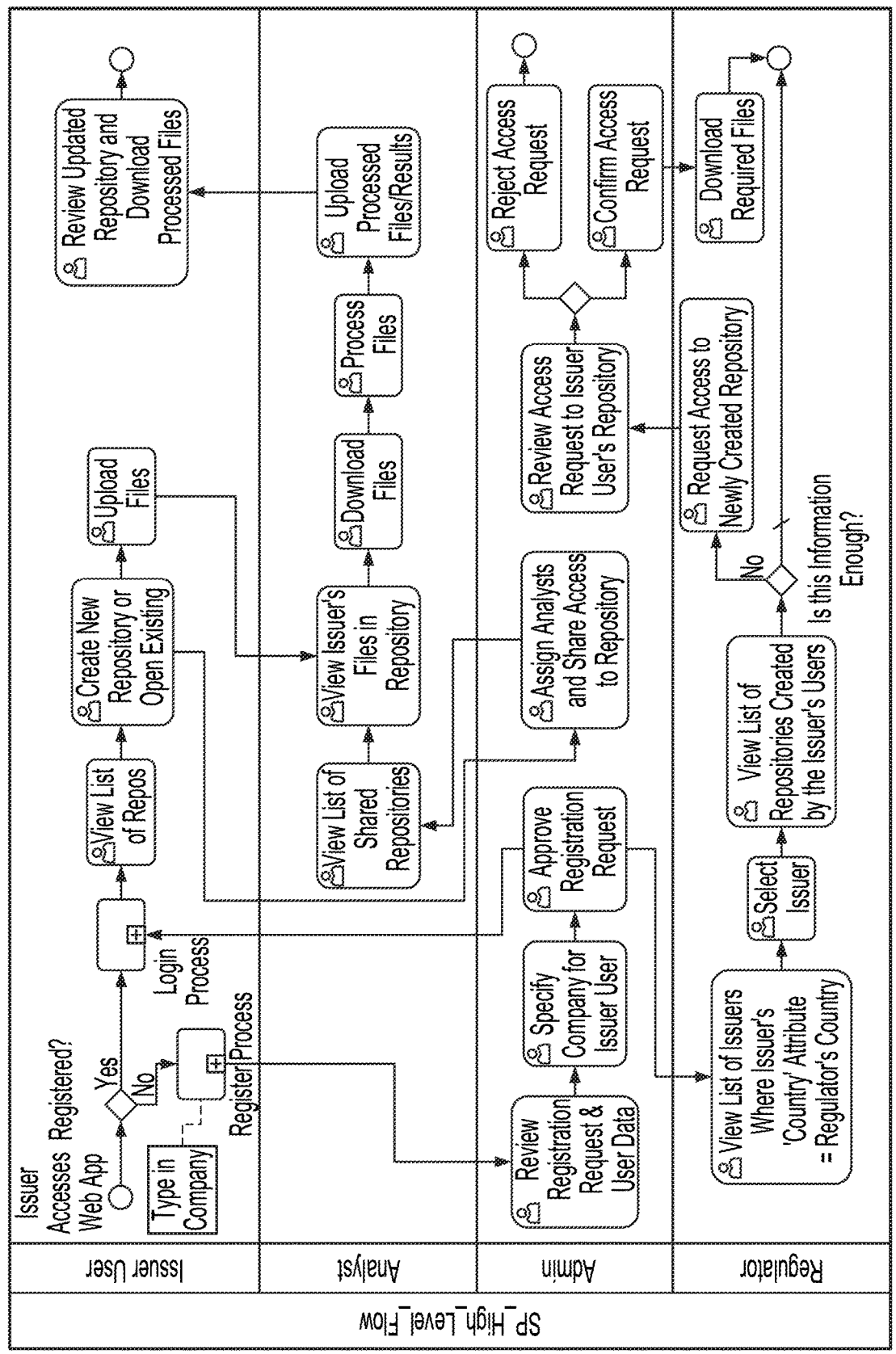
FIGS. 3A-3E illustrate workflows for a simple flow, registration process, regulator requesting access, creating and sharing a repository, and blocking and unblocking an existing user respectively.

FIGS. 3A-3E illustrate workflows for a simple flow, registration process, regulator requesting access, creating and sharing a repository, and blocking and unblocking an existing user respectively. With reference to FIG. 3A, the simple illustrated workflow includes an issuer accessing a web application and entering the name of a company. The system can determine if the user is registered.

If not, the issuer user is directed to a registration process, e.g., an administrator reviews the registration request and user data for the requesting user, specifies a company for the issuer user and approves/declines the registration request.

The issuer user can review a list of repositories and/or create a new repository. A repository can be a collection of files. As part of creating or opening an existing repository, an issuer user can request access and an administrator can assign one or more analysts to the repository and grant access to the analysts. In turn, an analyst can view a list of repositories that are shared with the analyst and can view files in a selected repository, download the files, process the files and upload the processed files and results. Similarly, an issuer/user can upload files into a repository and review an updated repository and download processed files.

Finally, a regulator can review a list of issuers, e.g., where an issuer's country attribute is the regulator's country, select an issuer, and view a list of repositories created by the issuer's users. If the regulator needs additional information, she can request that information, e.g., access to another repository, from an administrator. The administrator then reviews the access request and confirms or rejects access.

Figure 3B:
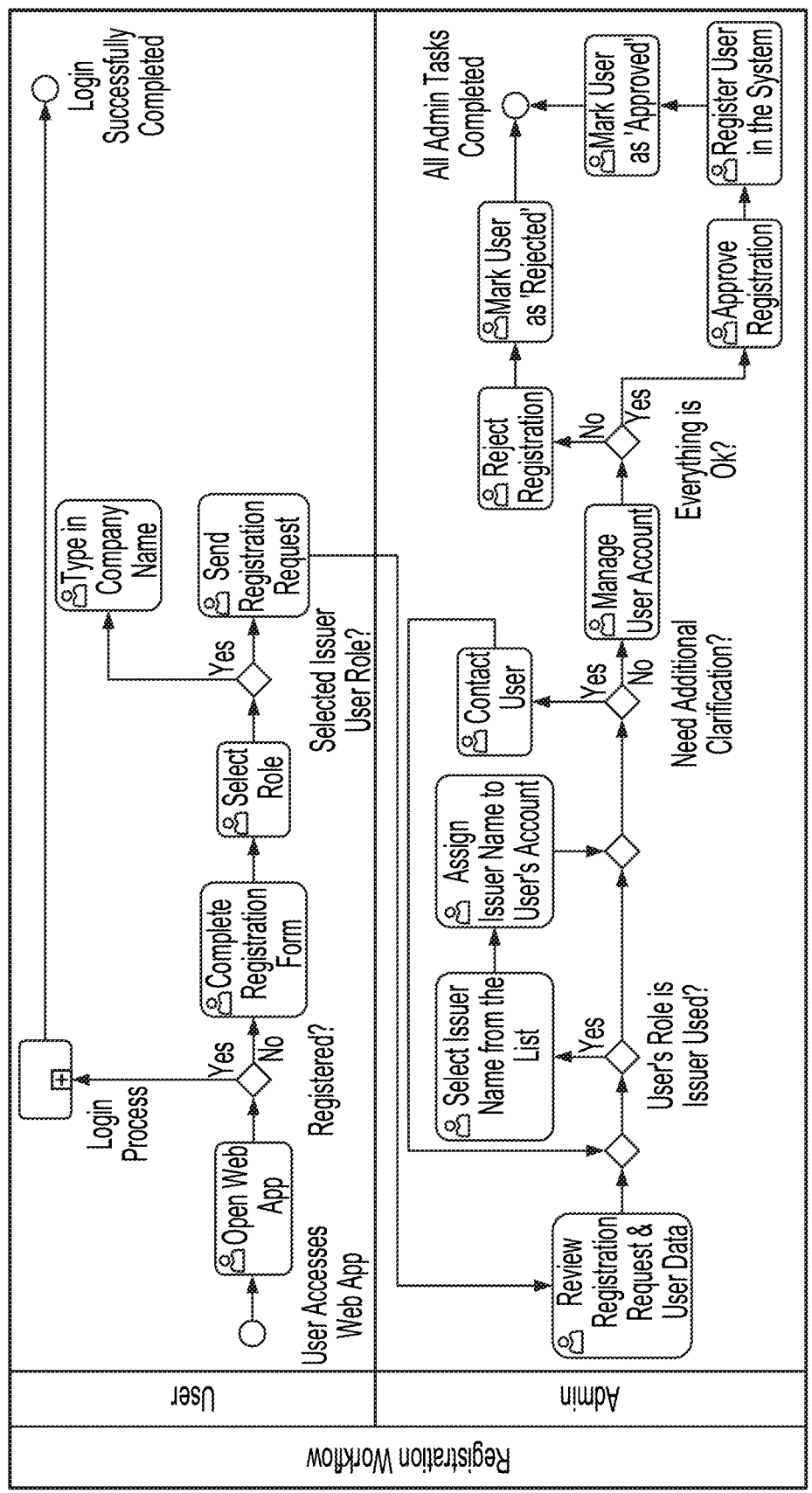
Figure 3C:
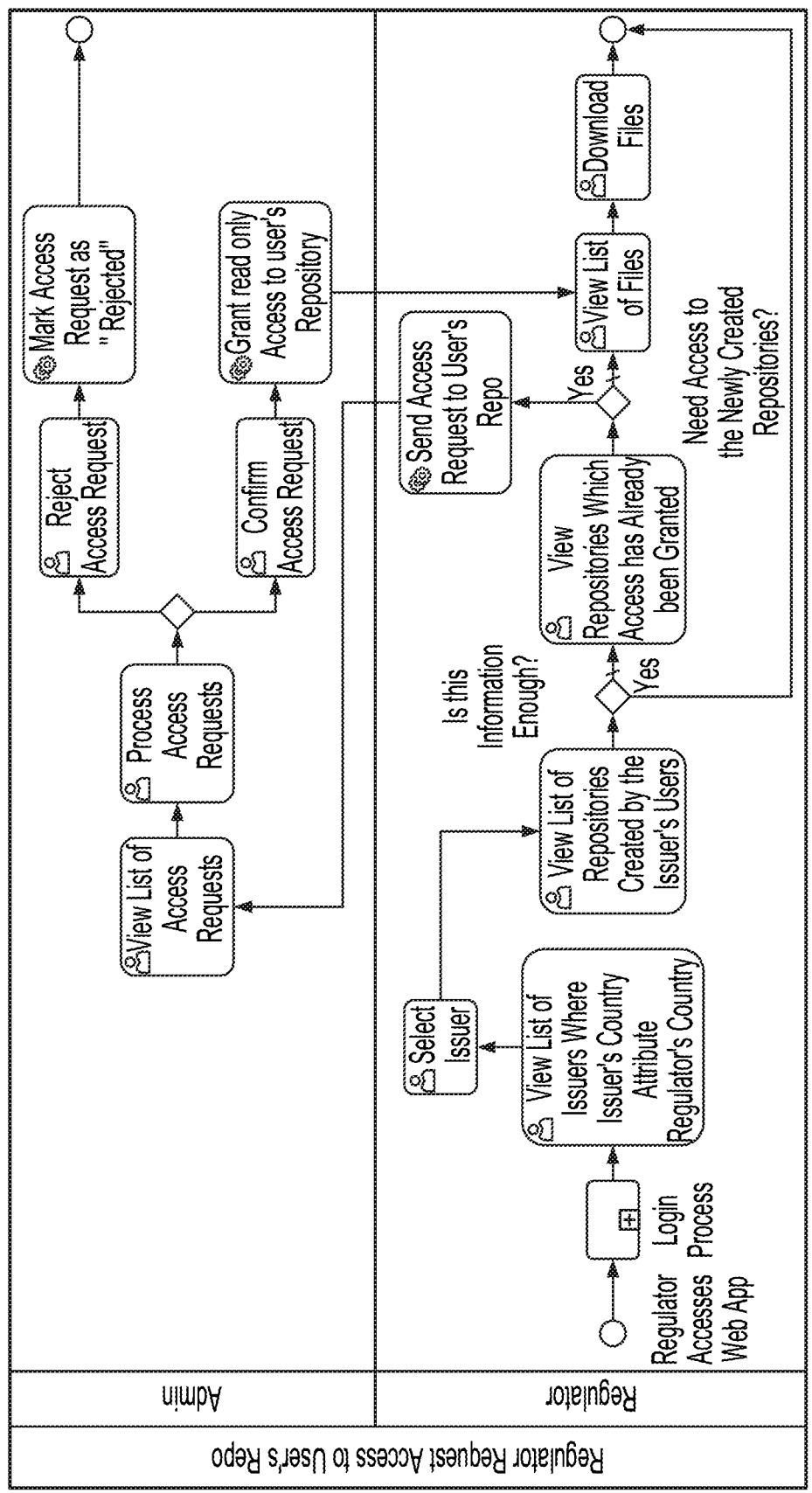
Figure 3D:
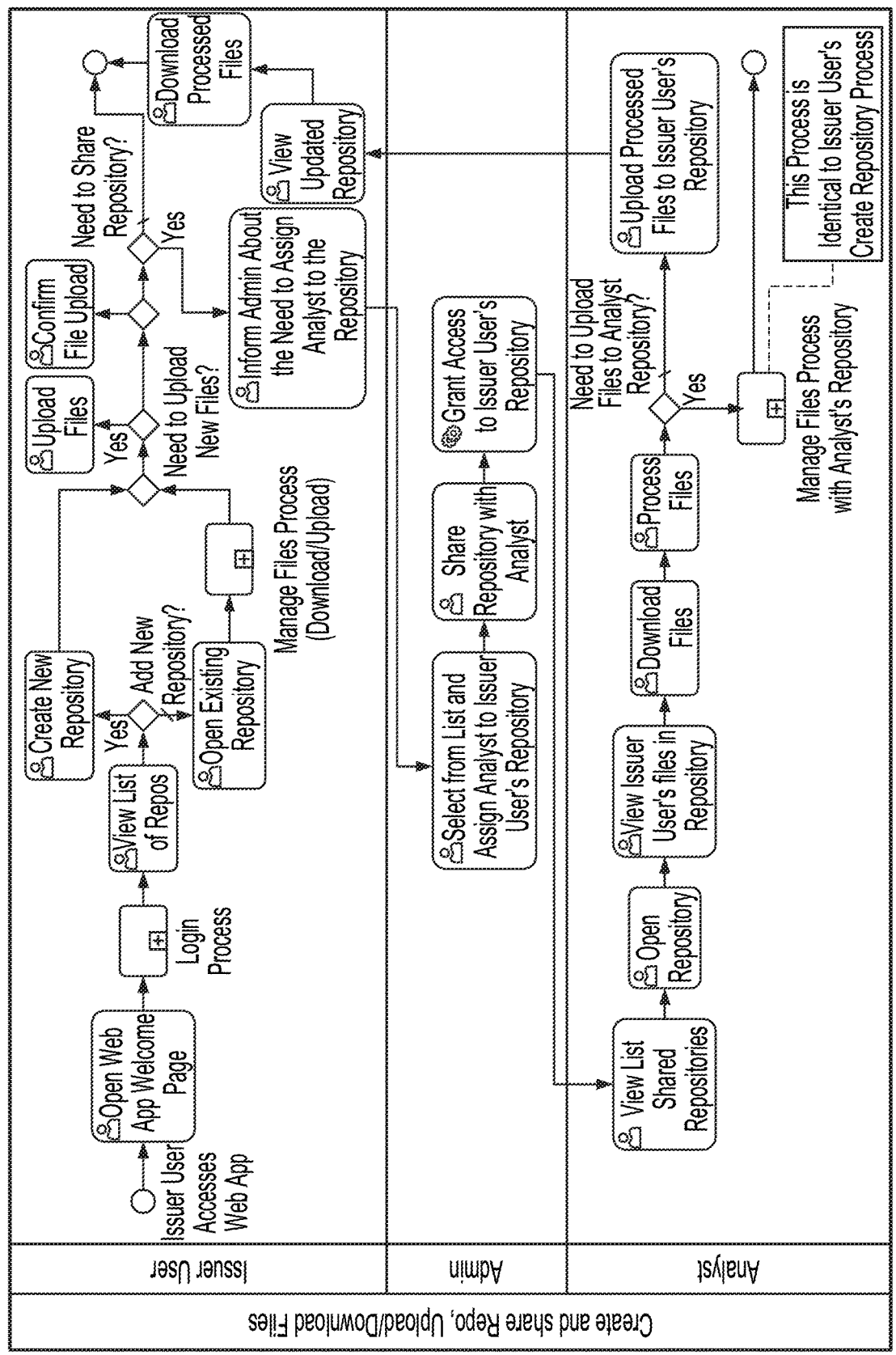
Figure 3E:
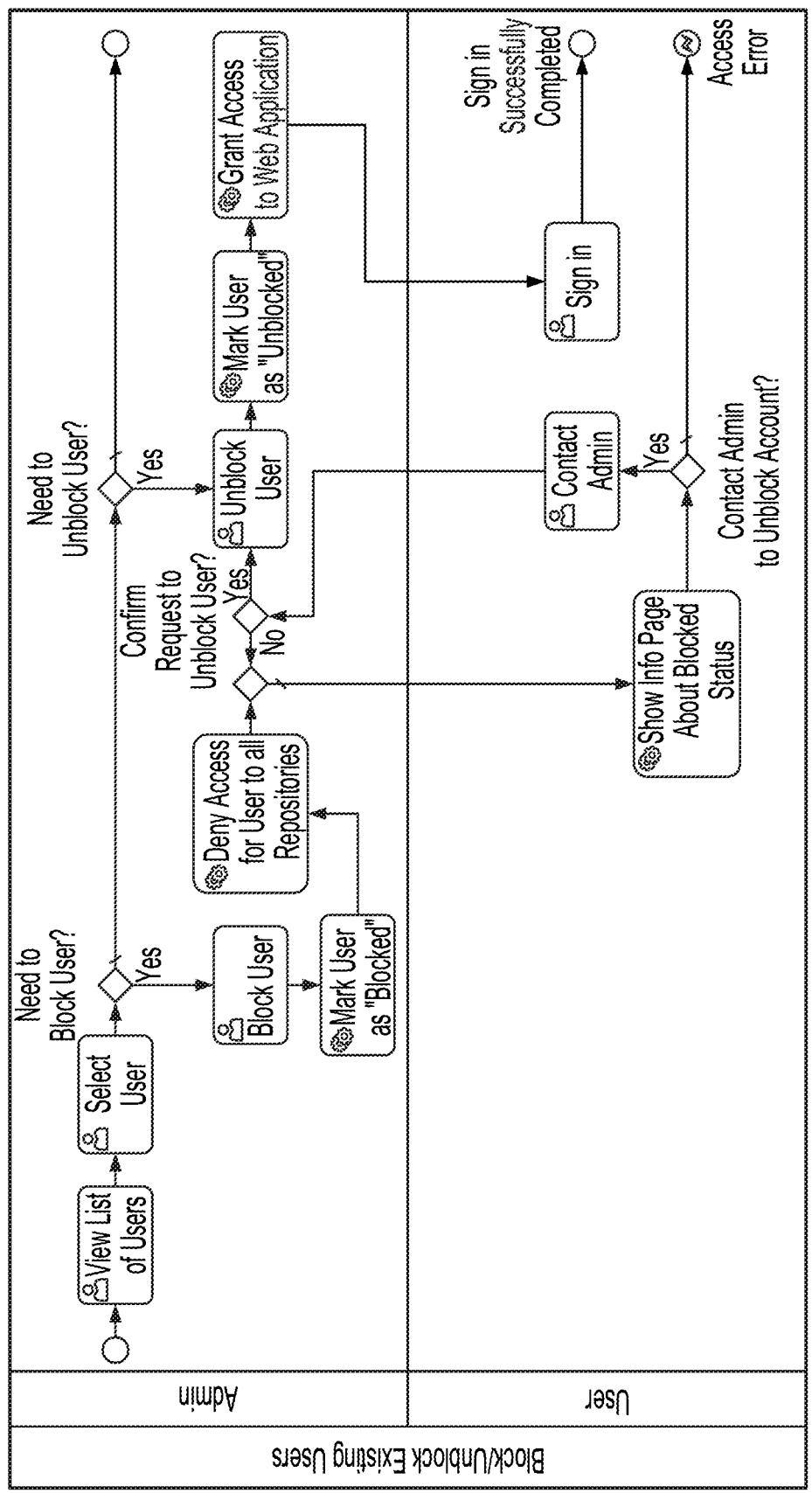

FIG. 3B is an illustration of a user registration process that is more detailed than FIG. 3A. FIG. 3C is an illustration of a process for a regulator to request access to a user repository. FIG. 3D is an illustration of a process for creating and sharing a repository, including uploading and downloading files. Finally, FIG. 3E is an illustration of a process for blocking and unblocking an existing user.

Registration
    A new user can register a new account so that he can start using the Application. An Administrator can for example receive an email with user's registration details so that he can register the user via LDAP.

Administrator
    In certain embodiments, an administrator can
        1) block/unblock an existing user (in LDAP) so that the user does not have access to the application anymore.
        2) review Regulator's repository access requests and grant/decline regulator access to Issuer User's repository so that the regulator can see and download the files from the repository.
        3) assign users to repository so that the repository contents can be shared\unshared with other users.
        4) rotate key's and seal and unseal the vault
        5) assign roles to each user.

Issuer
    In certain embodiments, an issuer can:
        1) create a repository so that the issuer can store my documents in the repository.
        2) view the contents of his repository so that he can review the files stored in the repository.
        3) view the list of repositories that he created so that he can select the repository and upload/download documents.
        4) view the contents of his repository so that he can review the files stored in the repository.
        5) upload documents to repository so that he can securely provide the sensitive documents to Analysts.

Analyst
    In certain embodiments, an analyst can:
        1) view the list of repositories that he created so that he can select the repository and upload/download documents inside.
        2) view the list of repositories to which he has been assigned so that he can exchange documents with an issuer or his team of Analysts.
        3) view the contents of repositories so that he can review the files stored inside.
        4) upload documents to a repository so that he can share results of his work with other users.
        5) create his own separate repository so that he can privately work on an issuer's data with his team.

Regulator
    In certain embodiments, a regulator can:
        1) view the list of Issuers from his country so that he can see the list of repositories created by the issuer's users.
        2) view the list of repositories created by an issuer's users so that he can request access to the repositories.
        3) access the repositories that he has been granted access to (by an administrator) so that he can see and download the contents.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving data identifying a user;
verifying that the user is an authorized user;
receiving initial content from the authorized user;
obtaining a unique identifier for the initial content and encrypting the unique identifier;
encrypting the initial content using an encryption key to produce encrypted content;
forwarding the encrypted content for storage on a private content network;
creating content storage metadata;
encrypting the content storage metadata to provide encrypted content storage metadata, wherein the encrypted content storage metadata comprises an initial content hash, and an encrypted unique identifier of the initial content;
adding the encrypted content storage metadata to a public blockchain;
controlling access to the encrypted content for the authorized user, wherein controlling access for the authorized user comprises determining if the authorized user is authorized to post a specified item of content and determining access to the encrypted content based at least in part on a regulatory jurisdiction of the authorized user.

2. The method of claim 1, wherein the method further comprises determining a hash based at least in part on the initial content and wherein the encrypted content storage metadata comprises a hash based at least in part on the initial content and a hash based at least in part on the encrypted content.

3. The method of claim 1, wherein controlling access for the authorized user comprises controlling access of the authorized user based at least in part on the at least one of the location and the citizenship of the authorized user.

4. The method of claim 1, wherein controlling access for the authorized user comprises using the principle of least privilege.

5. The method of claim 1, wherein verifying that the user is an authorized user is performed using lightweight directory access protocol.

6. The method of claim 1, wherein the encryption key is unique to the initial content and the method further comprises storing the encryption key in a key vault system.

7. The method of claim 5, wherein the method further comprises:
receiving a plurality of content items;
encrypting each content item with a unique encryption key resulting in a plurality of encryption keys; and
storing the plurality of encryption keys across nodes in the key vault system.

8. The method of claim 1, wherein the storage is a private, content-addressable, peer-to-peer system of storing and sharing content in a distributed file system.

9. The method of claim 1, wherein forwarding the encrypted content for storage comprising splitting content across nodes in a distributed file system.

10. The method of claim 1, wherein encrypting the initial content comprises encrypting the initial content at rest and in motion.

11. The method of claim 1, wherein the method further comprises automatically examining system data for anomalous activity and in the event of anomalous activity above a threshold re-encrypting encrypted content.

12. The method of claim 1, wherein the method further comprises providing an authorized regulator access to the content storage metadata.

13. The method of claim 1, wherein the blockchain is a public ledger blockchain.

14. The method of claim 1, wherein the content storage metadata comprises transaction data identifying particular content and who transacted with the particular content.

15. A system comprising:
one or more computers and one or more storage devices on which are stored instructions that are operable, when executed by the one or more computers, to cause the one or more computers to perform operations comprising:
receiving data identifying a user;
verifying that the user is an authorized user;
receiving initial content from the authorized user;
obtaining a unique identifier for the initial content and encrypting the unique identifier;
encrypting the initial content using an encryption key to produce encrypted content;
forwarding the encrypted content for storage on a private content network;
creating content storage metadata;
encrypting the content storage metadata to provide encrypted content storage metadata, wherein the encrypted content storage metadata comprises an initial content hash, and an encrypted unique identifier of the initial content;
adding the encrypted content storage metadata to a public blockchain;
controlling access to the encrypted content for the authorized user, wherein controlling access for the authorized user comprises determining if the authorized user is authorized to post a specified item of content and determining access to the encrypted content based at least in part on a regulatory jurisdiction of the authorized user.

* * * * *